US012192240B2

(12) United States Patent
Kondapi et al.

(10) Patent No.: US 12,192,240 B2
(45) Date of Patent: Jan. 7, 2025

(54) CO-MANAGING FIRMWARE CONFIGURATION AND UPDATES

(71) Applicant: Dell Products L.P., Round Rock, TX (US)

(72) Inventors: Srikanth Kondapi, Austin, TX (US); Carlton Andrews, Austin, TX (US); Nathan Martell, Taylor, TX (US)

(73) Assignee: Dell Products L.P., Round Rock, TX (US)

( * ) Notice: Subject to any disclaimer, the term of this patent is extended or adjusted under 35 U.S.C. 154(b) by 265 days.

(21) Appl. No.: 17/589,432

(22) Filed: Jan. 31, 2022

(65) Prior Publication Data

US 2023/0283637 A1    Sep. 7, 2023

(51) Int. Cl.
*H04L 9/40*    (2022.01)

(52) U.S. Cl.
CPC ............ *H04L 63/20* (2013.01); *H04L 63/083* (2013.01); *H04L 63/123* (2013.01)

(58) Field of Classification Search
CPC ...... H04L 63/123; H04L 63/083; H04L 63/20

USPC ............................................................ 726/7
See application file for complete search history.

(56) References Cited

U.S. PATENT DOCUMENTS

| 10,659,320 | B2 | 5/2020 | Andrews et al. | |
| 10,938,957 | B1 | 3/2021 | Rajagopalan et al. | |
| 2015/0089209 | A1* | 3/2015 | Jacobs | G06F 21/575 713/1 |
| 2015/0264122 | A1* | 9/2015 | Shau | H04L 67/10 709/203 |
| 2017/0048215 | A1* | 2/2017 | Straub | H04L 63/0823 |
| 2020/0244704 | A1 | 7/2020 | Andrews et al. | |

FOREIGN PATENT DOCUMENTS

EP    3609204 A1 *    2/2020    ......... H04L 61/1547

* cited by examiner

*Primary Examiner* — Bryan F Wright
(74) *Attorney, Agent, or Firm* — Larson Newman, LLP

(57) ABSTRACT

An information handling system is configured to remotely monitor a managed resource that includes lifecycle management and/or control of basic input/output system settings and administrator password. The information handling system is also configured to provide software and/or firmware updates on the managed resource using a binary large object with an entitlement to the managed resource.

20 Claims, 5 Drawing Sheets

CO-MANAGING FIRMWARE CONFIGURATION AND UPDATES

FIELD OF THE DISCLOSURE

The present disclosure generally relates to information handling systems, and more particularly relates to system and method for co-managing managed resources with a remote management system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system is configured to remotely monitor a managed resource that includes managing an entitlement for access to a secured component of the managed resource. The information handling system is configured to determine whether a function to be performed on the managed resource requires access to the secured component of the managed resource. The information handling system is further configured to transmit an application programming request to perform the function on the managed resource, wherein the application programming request includes a data object with the entitlement to access the secured component. In response to a verification of the authenticity of the data object is successful, then to process the data object that includes to invoke a plugin that is associated with the application and to execute the application with the entitlement as an argument.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Management systems are typically configured to orchestrate business processes by automating information technology processes to secure the enterprise and optimize user productivity. These management services generally do not have to be connected to a corporate network for monitoring and/or management processes such as firmware/software update or compliance, inventory status collection, etc. of its managed resources. However, when the managed resource is enrolled these management services may take over the lifecycle management and/or control of the basic input and output system/unified extensible firmware interface (BIOS/UEFI) settings, administrator password, or entitlement. Typically, the management systems use the same BIOS administrator password across their entire fleet of managed resources which may be a security concern. As used herein a password may also refer to other verification mechanisms such as secure keys or certificates.

Because software and/or firmware update are typically system/platform specific, information technology administrators typically use an update application such as Dell Command UpdateR to help identify, download, and/or install specific updates instead of performing the above manually. However, the update application may not function because it does not have visibility to the BIOS administrator password. Other operations such as information technology operations and cloud services used by the information technology administrator to perform other functions in managing the managed resources may also be affected because of their lack of visibility to the BIOS administrator password. To address these and other concerns, the present disclosure allows the capability to remotely manage each of the managed resources using a unique BIOS administrator password.

Figure 1:
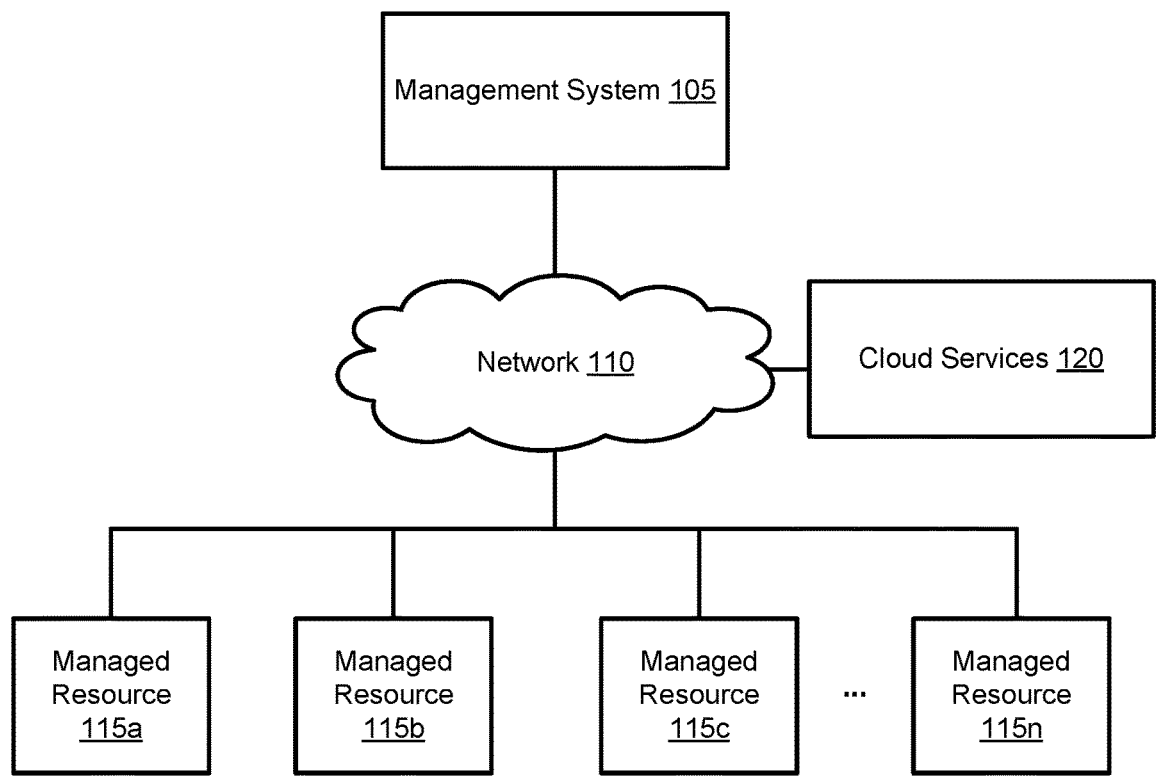
FIG. 1 is a block diagram illustrating an example of a system for co-managing managed resources with a remote management system, according to an embodiment of the present disclosure.

FIG. 1 shows an example of a managed system 100 where systems and methods for co-managing firmware configuration and updates with an endpoint management system may be implemented as depicted. The managed system 100 includes a management system 105 which is communicatively coupled with a plurality of managed resources 115a-115n and cloud services 120 via a network 110. Communication between the management system 105 and the managed devices may be secured such as using a hypertext transfer protocol secure (HTTPS) with transport layer security (TLS). Each of these components can be implemented with hardware and/or software, including virtual machines. Management system 105 may be implemented as a single management server or a plurality of virtual or physical servers which may or may not be geographically co-located. For example, management system 105 may be hosted in a cloud-based hosting service, such as cloud services 120.

Management system 105 may be configured to provide administrative support for physical, virtualized, containerized, or other types of managed resources 115a-115n. Management system 105 may be configured to centrally manage, secure, and/or control managed resources 115a-115n and applications and/or firmware therein. For example, the management system 105 may provide firmware configuration and updates for managed resource 115a using a particular BIOS administrator password. The management system 105 may also perform firmware configuration and update for the managed resource 115b using a different BIOS administrator password. Examples of management system 105 include Microsoft Intune® and Workspace ONE®.

Cloud services 120 may include various network-accessible distributed systems or services. Cloud services 120 may include access to cloud-based servers or other virtual machines. Cloud services 120 may be configured to build, manage, and share catalogs of the BIOS, firmware, driver, and application updates. In addition, cloud services 120 may be configured to generate an update package which may be used by an information technology administrator to download and install the updates. For example, cloud services 120 may be an original equipment manufacturer (OEM) support site which can provide drivers, application, and/or firmware updates to managed resources 115a-115n. Cloud services 120 may also include Software as a Service (SaaS) and information technology operations as a service for providing cloud-based applications and cloud operations respectively.

Network 110 may be implemented as or maybe a part of, a personal area network (PAN), a local area network (LAN), a metropolitan area network (MAN), a wide area network (WAN), a wireless local area network (WLAN), a virtual private network (VPN), an intranet, the Internet, or any other appropriate architecture or system that facilitates the communication of signals, data and/or messages. Network 110 may transmit data using any communication protocol, including without limitation, Fibre Channel, Frame Relay, Asynchronous Transfer Mode (ATM), Internet Protocol (IP), other packet-based protocol. Network 110 and its various components may be implemented using hardware, software, or any combination thereof. These components may be configured to facilitate communication between management system 105, managed resources 115a-115n, and cloud service 120.

Figure 5:
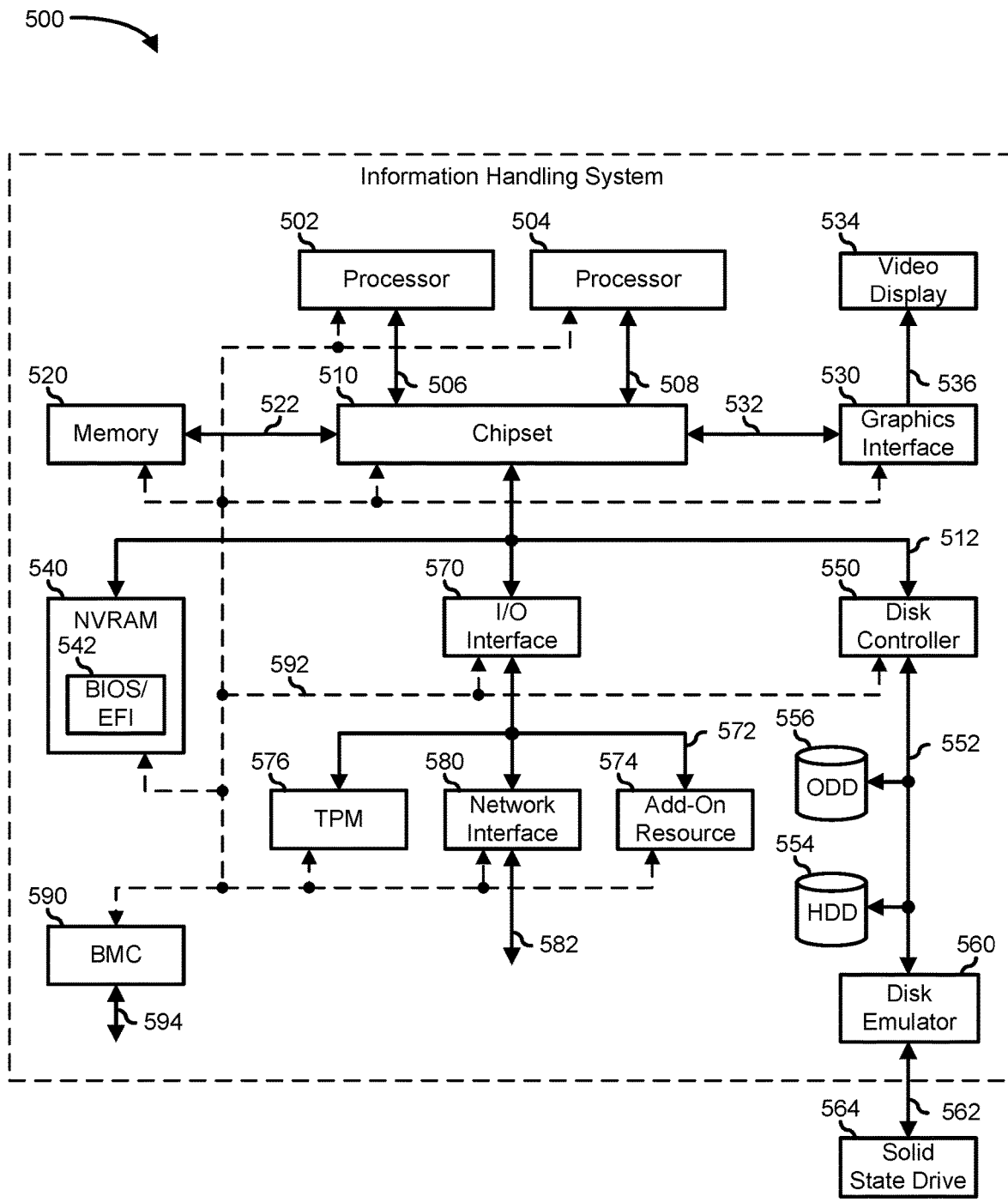
FIG. 5 is a block diagram illustrating an information handling system according to an embodiment of the present disclosure.

Managed resources 115a-115n include computing devices and/or information handling systems similar to information handling system 500 of FIG. 5. The managed resources 115a-115n may include physical, virtualized, containerized, or other types of information handling systems. For example, managed resources 115a-115n may be a laptop, a desktop, a server, a mobile device, etc. that can be managed centrally. Each of managed resources 115a-115n may be a server device such as an enterprise service, application server, email server, web server, content server, application server, etc. Management resources 115a-115n may also be client devices such as a desktop computer, a tablet, a smartphone, etc. In some arrangements, managed resources 115a-115n may include both server devices and client devices. Managed resources 115a-115n may also include Internet-of-things (IoT) devices, such as household IoT devices, commercial IoT devices, industrial IoT devices, medical IoT devices, etc. Further, each of the managed resources 115a-115n may include a network interface with the capability of sending and receiving information. Managed resources 115a-115n may also include cloud-hosted applications or services.

Figure 2:
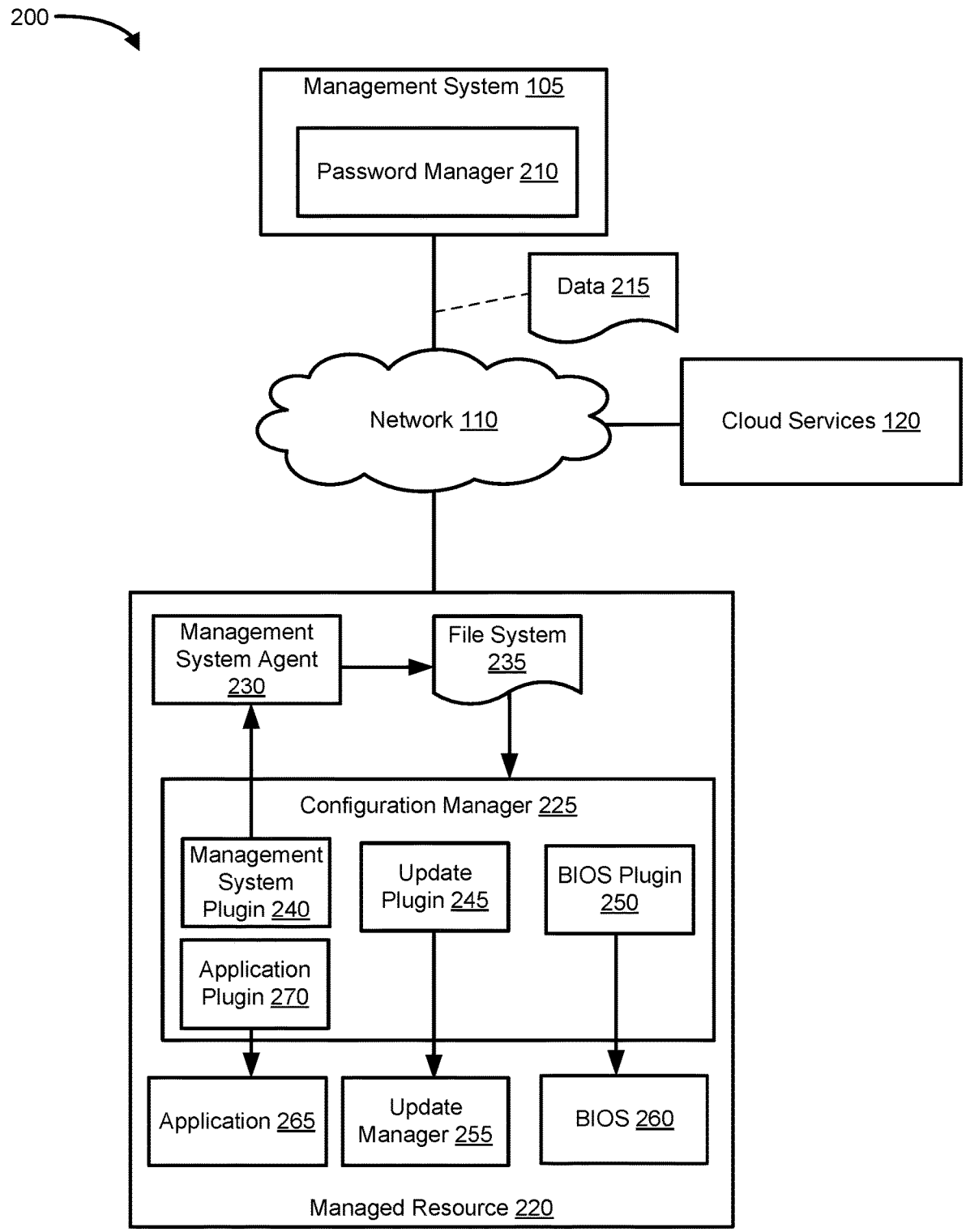
FIG. 2 is a block diagram illustrating an example of a system for co-managing managed resources with a remote management system, according to an embodiment of the present disclosure.

FIG. 2 shows an example of a managed system 200, which is similar to managed system 100 in greater detail. Management system 200 includes a management system 105, a cloud services 120, a network 110, and a managed resource 220 which is similar to one of managed resources 115a-115n. Managed resource 220 includes a configuration manager 225, a management system agent 230, a file system 235, an update manager 255, and a BIOS 260 which is similar to a basic input and output system/extensible firmware interface (BIOS/EFI) module 542 of FIG. 5. The components of managed system 200 may be implemented in hardware, software, firmware, or any combination thereof. The components shown are not drawn to scale and managed system 200 may include additional or fewer components. In addition, connections between components may be omitted for descriptive clarity.

Management system 105 may be configured to manage and/or monitor managed resource 220. For example, management system 105, which may be located remotely, manages software and/or firmware updates of various components of managed resource 220.

Management system 205 also allows information technology administrators to manage BIOS configurations of the managed resource 220. In addition, management system 105 may be configured to handle lifecycle management and/or control of the BIOS settings and administrator password. In addition, password manager 210, which may be referred to as an entitlement manager, may be configured to manage entitlements for one or more managed resources and/or their components and applications. In particular, password manager 210 may be configured to manage other security credentials such as an entitlement which may include a password, authentication certificate, a secured key, or similar that is used to access or consume an application or a resource. For example, instead of having the entitlement across managed resource 220, management system 105, via a password manager 210, may be configured to generate and/or manage a unique entitlement for each one of the managed resources such as managed resource 220. Referring to FIG. 1, in one example, the management system 105 may provide firmware configuration and updates for managed resource 115a of using a particular entitlement, such as a secure key. The management system 105 may also perform firmware configuration and update for managed resource 115b using a BIOS administrator password or a different secure key.

Update manager 255 may be configured to provide software and/or firmware updates to managed resource 220. Update manager 255 may be configured to download, import catalogs, applications, and/or updates for the managed resource 220. For example, update manager 255 may provide BIOS, firmware, driver, and/or application updates. The update plugin 245 may be configured to communicate with the update manager 255 and install one or more targeted updates on-demand with the BIOS administrator password as an argument. In one embodiment, before performing the software and/or firmware update, update manager 255 may submit a request to management system 105 or password manager 210 for the BIOS administrator password to grant update manager 255 access to BIOS 260. In another embodiment, update manager 255 may submit a request to cloud services 120 for the BIOS administrator password. Cloud services 120 in turn submits the request to management system 105 or password manager 210 which then sends a response with the BIOS administrator password to update manager 255.

Data 215 also referred herein as a data object may be a container that includes one or more data binary large objects (BLOB) and metadata file transmitted to managed resource 220 from management system 105 or vice versa. The BLOB may be a set of unstructured data such as text and binary data stored as a single entity or object. The BLOB may include audio, video, email messages, archived files, zip files, or a word processing document. The metadata file may be name, value pairs with data associated with the BLOB, and/or managed resource 220. For example, the name, value pair may include "command type" for the name with a value of "update." Another name, value pair may include "target" for the name with a value of "BIOS."

The data 215 or a portion thereof may be created or generated by a user such as an information technology administrator as part of managing and/or monitoring managed resource 220. The information technology administrator may use management system 105, a local application, a remote streaming application, or a web application/service such as cloud services 120 to generate the data 215. In another embodiment, the data 215 may be automatically generated by management system 105. In yet another embodiment, the information technology administrator may use cloud services 120 to send an application programming interface (API) request to management system 105 with a BLOB as the payload and information associated with a target endpoint, such as managed resource 220. By sending the API request with the BLOB as the payload, the cloud services 120 may perform various functions on the target endpoint without knowledge or duplicate management of the BIOS administrator password. The API request may be a representational state transfer (REST)ful web API that allows access to management system 105. Further, data 215 may be encrypted and/or signed prior to its transmission to the managed resource 220. In one example, the information technology administrator may generate the BLOB and transmit the BLOB to the management system 105 which then generates metadata and wraps the BLOB with the metadata.

The management system 105 may transmit a RESTful API request to perform a function on one of the managed resources such as the managed resource 220. However, the RESTful API request may require an entitlement to perform the function on a secured component of the managed resource 220. The entitlement to access the secured component of the managed resource may also managed by the management system 105. For example, the management system 105 may update a BIOS firmware in which it may require a BIOS administrator password. The management system 105 may determine whether the function requires access the secured component to perform the function or requires an entitlement to perform the function itself. The management system 105 may include the entitlement in the RESTful API request as part of a data object, in response to a determination that the function requires access to the secured component. The managed resource 220 may execute the function with the entitlement as an argument subsequent to a verification of the authenticity of the data object and processing thereof.

The data 215 may include information, metadata, executable code, or command associated with managed resource 220. The data 215 may also include the BIOS administrator password for authentication and/or authorization. In one example, the data 215 may include a command or a set of program instructions instead of an update package, wherein the command is used to instruct configuration manager 225 to perform a BIOS configuration update. Because the data 215 does not include the update package which is typically specific to a particular platform but instead includes a generic update command, the data 215 may be used to update a wide range of managed resources with different platforms. The data 215 may be transmitted to the management system agent 230 which may drop or store the data 215 at a non-volatile memory as part of a file system 235. The data 215 may be transmitted to management system agent 230 which may pre-process and/or store data 215 as a file with an access control list like as part of a file system 235 which may include one or more methods and/or data structure to control how data 215 is stored and retrieved. In another embodiment, the management system agent 230 may transmit a signal to the configuration manager 225 to notify the configuration manager 225 that the data 215 is stored in a memory.

Configuration manager 225 may be configured to provide a secure interface to enable a user such as an information technology administrator of managed resource to securely access and/or receive data and/or functions associated with management system 105. A secure interface may include a secure web browser interface such as a hypertext transfer protocol secure (HTTPS) interface with a secure socket layer (SSL) or a secure shell (SSH), a user/password log-in authentication, an encrypted interface such as a public key infrastructure (PKI) interface, an interface secured by a virtual area network (VLAN), another secure interface, or a combination thereof.

Configuration manager 225 may be configured to determine and/or detect the data 215 in the file system 235 via a secure interface. The configuration manager 225 includes one or more plugins to communicate with other components, devices, or applications of managed resource 220. For example, the configuration manager 225 may include a management system plugin 240, an update plugin 245, a BIOS plugin 250, and an application plugin 270. Each plugin may be associated with a device and/or application that can execute the command or function included in the data 215. In another embodiment, a plugin may be associated with more than one component, device, application, or a combination thereof. In this example, update plugin 245 may be configured to facilitate communication between the update manager 255 and the configuration manager 225. Similarly, the BIOS plugin 250 may be associated with the BIOS 260 while the management system plugin 240 may be associated with the management system agent 230. In addition, an application plugin 270 is associated with application 265.

The configuration manager 225 may process the data 215 and based on the information and/or data included, the configuration manager 225 may determine which plugin to invoke. The plugin then invokes one of the components or processing devices, wherein the component or the processing device may be configured to perform the command and/or function in the data 215. For example, when the configuration manager 225 determines that data 215 includes BIOS firmware and/or configuration settings update, then the configuration manager 225 may invoke BIOS plugin 250 to update the BIOS firmware and/or configuration settings of the BIOS 260 and/or an embedded controller. In another example, when the configuration manager 225 determines that data 215 includes software and/or application updates, and then the configuration manager 225 may use the update plugin 245 to invoke the update manager 255. In yet another example, when the configuration manager 225 determines that data 215 includes a BIOS administrator password for application 265, then the configuration manager 225 may invoke application plugin 270.

The update manager 255 may be configured to manage software and/or firmware updates to managed resource 220 such as to download, import catalogs, and/or updates for the various components and/or applications of managed resource 220. For example, update manager 255 may provide BIOS, firmware, driver, and/or application updates. Based on the command, the update manager 255 may download a particular update package from an update service such as cloud services 120 and apply it to the managed resource 220. During the above processes, configuration manager 225 may also provide the current BIOS administrator password, which may have been included in the data 215, to the BIOS 260 and/or update manager 255 . . . . For example, when the configuration manager 225 invoke the update manager 255 via update plugin 245 to install one or more targeted updates on-demand with the BIOS administrator password as an argument. The configuration manager 225 may also update or rotate the BIOS administrator password after successfully performing the process based on the information in the data 215 and transmit the status of the process and/or a new BIOS administrator password to management system 105 via management system plugin 240. The update and/or rotation of the BIOS administrator password may be performed on subsequent boot, such as after successfully processing data 215

Configuration manager 225 may be configured to include one or more plugins to communicate with other components of managed resource 220. For example, the configuration manager 225 may include a management system plugin 240, an update plugin 245, and a BIOS plugin 250. Management system plugin 240 may be configured to communicate with management system agent 230. Update plugin 245 may be configured to communicate with update manager 255, wherein update plugin 245 may transmit a command for a software or application update to update manager 255. Based on the command, update manager 255 may download an update package from an update service such as cloud services 120 and apply it to managed resource 220. BIOS plugin 250 may be configured to communicate with BIOS 260 and/or an embedded controller, wherein BIOS plugin 250 may be configured to apply BIOS configuration changes and/or firmware updates. Also, application plugin 270 may be configured to communicate with application 265.

Application 265 may be a protected application that runs locally on managed resource 220. The access protection may also prevent application 265 to access secured components such as a secure storage device without credentials. Prior to the access of a secured component, application 265 may request for an entitlement that allows it the right to use or access the secured component and/or its content. At or before execution of application 265, delivery of the entitlement which may be included in data 215 may be triggered.

For example, before the execution of a set of program instructions, application 265 may determine it needs security credentials. Accordingly, application 265 may transmit a request for the entitlement to cloud service 120, management system 105, or password manager 210 in particular. Password manager 210 may then transmit a response that includes a package such as data 215. Although data 215 may include a BLOB and a metadata file as discussed above, data 215 may include other contents such as an update package. In another example, data 215 may not have other contents except for the entitlement which is transmitted to management system agent 230 which may drop it in non-volatile storage or cache. The entitlement may then be transmitted to configuration manager 225 which triggers a plugin associated with application 265. The plugin may then hand over the data 215, the entitlement, or a location where data 215 was dropped to the application. Upon receipt, the entitlement goes through security checks, assuming the entitlement passed accorded security checks, application 265 may proceed with its execution of the set of program instructions as it now has access to the secured component and/or its contents, wherein application 265 didn't have access before. Otherwise, data 215 may be deleted from its dropped location. In addition, application 265 may stop its execution and/or log an error or status.

Figure 3:
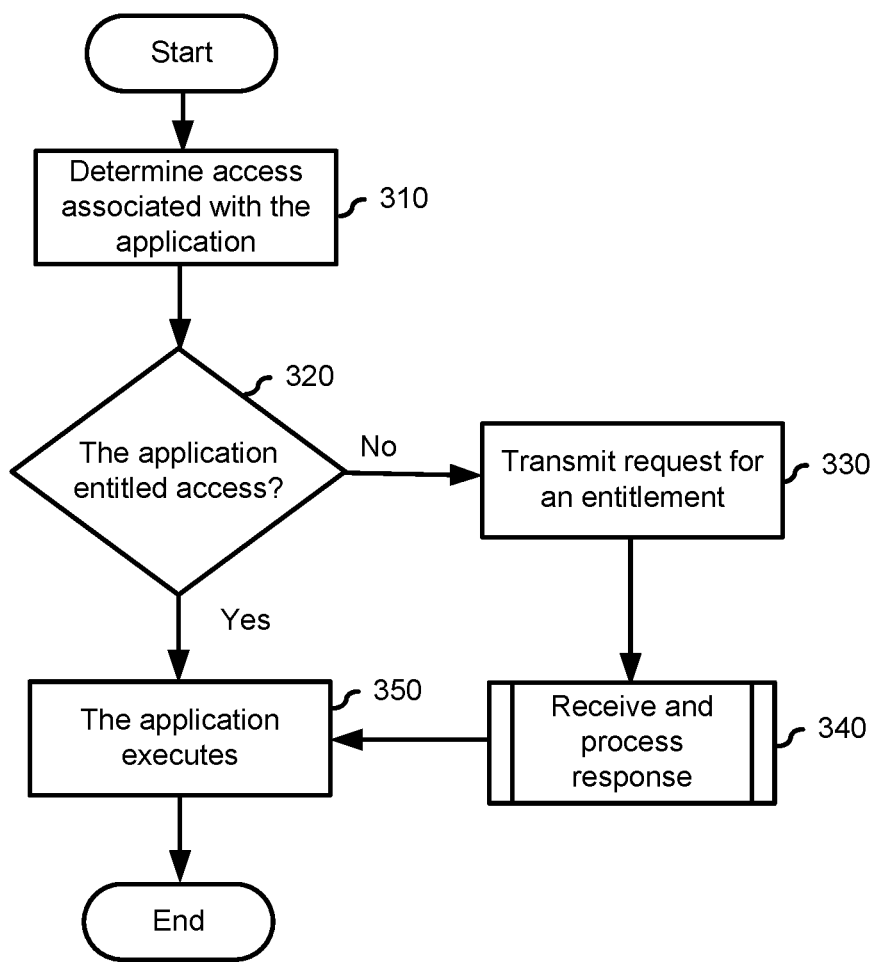
FIG. 3 is a flowchart illustrating an example of a method for enabling access of an application to a component of a managed resource via a remote management system, according to an embodiment of the present disclosure.

FIG. 3 shows a flowchart of an example method 300 for enabling access of an application to a component of an information handling system via a remote management system. Method 300 may be performed by an application that is installed locally at the information handling system, such as application 265 of FIG. 2, wherein the information handling system is managed by the remote management system. While the embodiments of the present disclosure are described in terms of management system 200 of FIG. 2, it should be recognized that other systems may be utilized to perform the described method. In addition, one of skill in the art will appreciate that this flowchart explains a typical example, which can be extended to advanced applications or services in practice.

Method 300 typically starts at block 310 wherein the application determines access rights to a secured component and/or its contents. The application may make the determination prior to or during the execution of a set of program instructions in the application. For example, the application may be an application to update the BIOS/UEFI firmware. However, the application does not have access rights to update and/or change a BIOS/UEFI setting. The method proceeds to decision block 320, where if the application has access rights to the secured component and/or its contents, then the "YES" branch is taken and the method proceeds to block 350 where the application executes. The application may be executed with the entitlement as an argument. After execution, the application may transmit a status to a configuration manager or management system agent. If the application does not have access rights to the secured component and/or its contents, then the "NO" branch is taken and the method proceeds to block 330 where the method transmits or triggers a request for entitlement or access rights to the secured component and/or its contents. The request may be transmitted to the remote management system that manages the information handling system. The method proceeds to block 340, where the method receives and processes a response from the remote management system such as executing method 400 of FIG. 4, wherein the response includes the entitlement. In addition, the response may also include a new entitlement for rotation. The method then proceeds to block 350.

Figure 4:
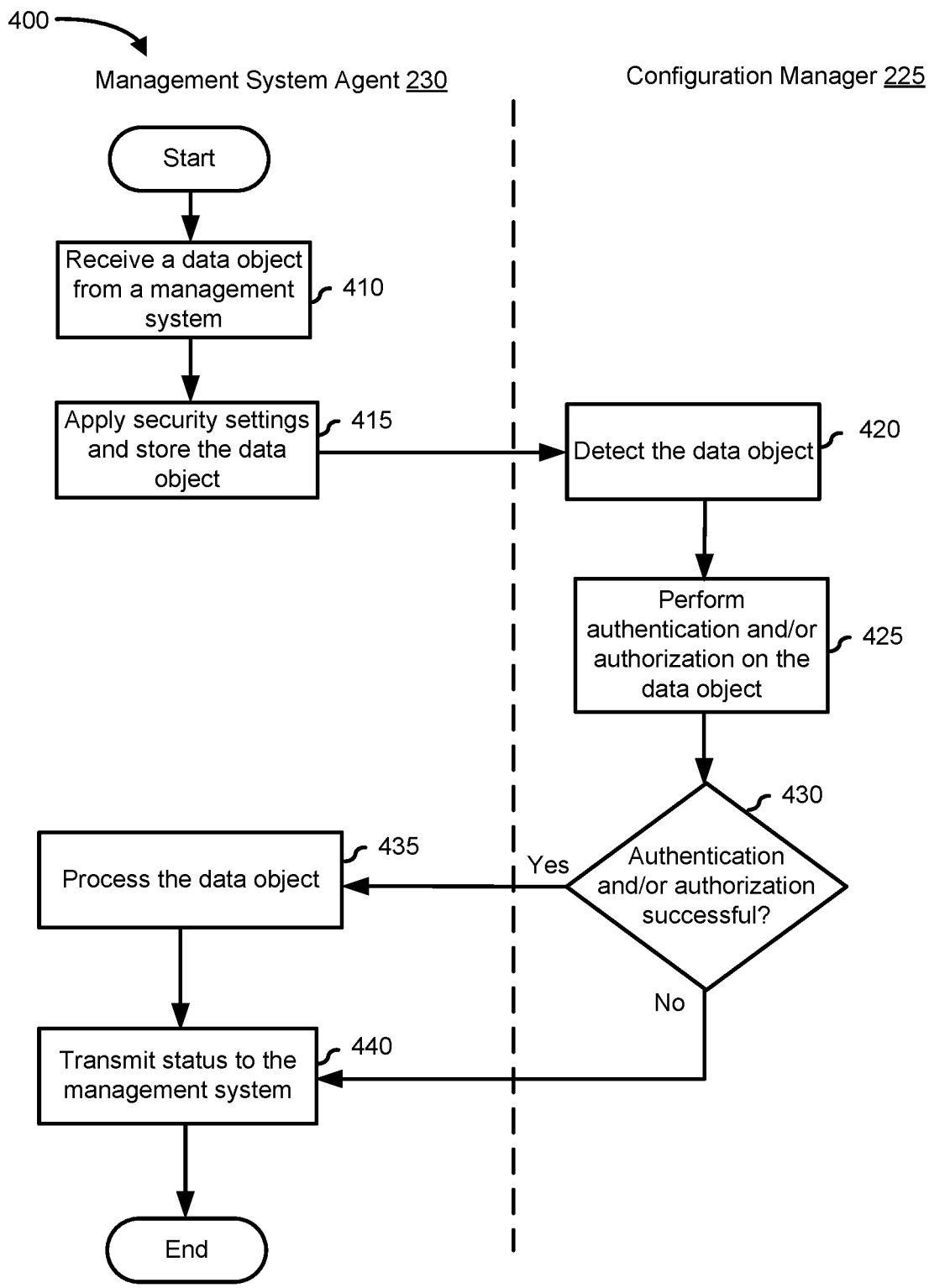
FIG. 4 is a flowchart illustrating an example of a method for co-managing managed resources with a remote management system, according to an embodiment of the present disclosure.

FIG. 4 shows a flowchart of an example method 400 for co-managing firmware configuration and updates with an endpoint or a resource management system. While embodiments of the present disclosure are described in terms of management system 200 of FIG. 2, it should be recognized that other systems may be utilized to perform the described method. In this example, management system agent 230 performs blocks 410, 415, 435, and 440. While configuration manager 225 performs block 420, block 425, and decision block 430. One of skill in the art will appreciate that this flowchart explains a typical example, which can be extended to advanced applications or services in practice.

Method 400 typically starts at block 410 where a data object, which may be signed and/or encrypted and includes a BLOB that may be accompanied by a metadata file may be received at a managed resource, wherein the data object is from a management system such as management system 105 of FIG. 1. The BLOB may include information associated with the managed resource, such as a command to be performed on the managed resource. The metadata file may include current and new entitlements such as current and new BIOS administrator passwords as applicable.

At block 415, the management system agent 230 may apply security settings and may drop or store the data object in a non-volatile memory or cache in a secure file system. For example, the file system may be implemented with an access control list to limit access and to authorized users or a group of users. The access control list also limits what can be done with the data object.

At block 420, the configuration manager 225 determines or detects the data object in the file system. In one example, the configuration agent monitors the file system continuously or periodically to detect whether a new data object has been added to the file system. In another example, the management system agent informs the configuration agent that the data object has been added to the file system.

At block 425, a configuration agent may verify the authenticity of the data object such as by performing certificate and/or security checks. The configuration agent may verify the identity of the sender of the data object and ensure that it has not been altered in transit. The management system agent may also verify the authority of the function and/or command associated with the data object by checking the entitlement such as the BIOS administrator password associated with the data object and/or the digital signature of the data object. Additionally, communication between the management system and the managed device may be secured such as using a hypertext transfer protocol secure (HTTPS) such as by using transport layer security (TLS). At decision block 430, the configuration manager 225 may determine whether the authentication and/or authorization are successful. If the data object is successfully verified, then the "YES" branch is taken and the method may proceed to block 435. If the data object fails verification, then the "NO" branch is taken and the method may proceed to block 440. In another embodiment, if the authentication and/or authorization fail, then the data object may be deleted from the non-volatile memory by the management system agent 230 or configuration manager 225. The data object may be deleted before or after block 440.

At block 435, the configuration agent processes the data object and determines which plugin to use for the data object. For example, if the information in the BLOB included in the data object is to update the BIOS configuration setting, update the BIOS firmware, and/or update the firmware of an embedded controller then the configuration agent may use the BIOS plugin to perform the above. In another example, if the information in the BLOB included in the data object is to perform software and/or application update, then the configuration may use the update plugin to invoke the update manager to perform the update. During the processing, the configuration manager 225 may also rotate the current entitlement with a new entitlement. For example, the configuration manager 225 may rotate current BIOS administrator password with a new BIOS administrator password on reboot. At block 440, the management system agent 230 may transmit status to the management system. For example, the configuration manager 225 may transmit the status of the data object and/or the processing, such as pending," "successful," or "failure" to the management system agent 230.

FIG. 5 illustrates an embodiment of an information handling system 500 including processors 502 and 504, a chipset 510, a memory 520, a graphics adapter 530 connected to a video display 534, a non-volatile RAM (NV-RAM) 540 that includes a basic input and output system/extensible firmware interface (BIOS/EFI) module 542, a disk controller 550, a hard disk drive (HDD) 554, an optical disk drive 556, a disk emulator 560 connected to a solid-state drive (SSD) 564, an input/output (I/O) interface 570 connected to an add-on resource 574 and a trusted platform module (TPM) 576, a network interface 580, and a baseboard management controller (BMC) 590. Processor 502 is connected to chipset 510 via processor interface 506, and processor 504 is connected to the chipset via processor interface 508. In a particular embodiment, processors 502 and 504 are connected together via a high-capacity coherent fabric, such as a HyperTransport link, a QuickPath Interconnect, or the like. Chipset 510 represents an integrated circuit or group of integrated circuits that manage the data flow between processors 502 and 504 and the other elements of information handling system 500. In a particular embodiment, chipset 510 represents a pair of integrated circuits, such as a northbridge component and a southbridge component. In another embodiment, some or all of the functions and features of chipset 510 are integrated with one or more of processors 502 and 504.

Memory 520 is connected to chipset 510 via a memory interface 522. An example of memory interface 522 includes a Double Data Rate (DDR) memory channel and memory 520 represents one or more DDR Dual In-Line Memory Modules (DIMMs). In a particular embodiment, memory interface 522 represents two or more DDR channels. In another embodiment, one or more of processors 502 and 504 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 520 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 530 is connected to chipset 510 via a graphics interface 532 and provides a video display output 536 to a video display 534. An example of a graphics interface 532 includes a Peripheral Component Interconnect-Express (PCIe) interface and graphics adapter 530 can include a four-lane (x4) PCIe adapter, an eight-lane (x8) PCIe adapter, a 16-lane (x16) PCIe adapter, or another configuration, as needed or desired. In a particular embodiment, graphics adapter 530 is provided down on a system printed circuit board (PCB). Video display output 536 can include a Digital Video Interface (DVI), a High-Definition Multimedia Interface (HDMI), a DisplayPort interface, or the like, and video display 534 can include a monitor, a smart television, an embedded display such as a laptop computer display, or the like.

NV-RAM 540, disk controller 550, and I/O interface 570 are connected to chipset 510 via an I/O channel 512. An example of I/O channel 512 includes one or more point-to-point PCIe links between chipset 510 and each of NV-RAM 540, disk controller 550, and I/O interface 570. Chipset 510 can also include one or more other I/O interfaces, including a PCIe interface, an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. NV-RAM 540 includes BIOS/EFI module 542 that stores machine-executable code (BIOS/EFI code) that operates to detect the resources of information handling system 500, to provide drivers for the resources, to initialize the resources, and to provide common access mechanisms for the resources. The functions and features of BIOS/EFI module 442 will be further described below.

Disk controller 550 includes a disk interface 552 that connects the disc controller to a hard disk drive (HDD) 554, to an optical disk drive (ODD) 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits SSD 564 to be connected to information handling system 500 via an external interface 562. An example of external interface 562 includes a USB interface, an institute of electrical and electronics engineers (IEEE) 1394 (Firewire) interface, a proprietary interface, or a combination thereof. Alternatively, SSD 564 can be disposed within information handling system 500.

I/O interface 570 includes a peripheral interface 572 that connects the I/O interface to add-on resource 574, to TPM 576, and to network interface 580. Peripheral interface 572 can be the same type of interface as I/O channel 512 or can be a different type of interface. As such, I/O interface 570 extends the capacity of I/O channel 512 when peripheral interface 572 and the I/O channel are of the same type, and the I/O interface translates information from a format suitable to the I/O channel to a format suitable to the peripheral interface 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on a separate circuit board or add-in card disposed within information handling system 500, a device that is external to the information handling system, or a combination thereof.

Network interface 580 represents a network communication device disposed within information handling system 500, on a main circuit board of the information handling system, integrated onto another component such as chipset 510, in another suitable location, or a combination thereof. Network interface 580 includes a network channel 582 that provides an interface to devices that are external to information handling system 500. In a particular embodiment, network channel 582 is of a different type than peripheral interface 572, and network interface 580 translates information from a format suitable to the peripheral channel to a format suitable to external devices.

In a particular embodiment, network interface 580 includes a NIC or host bus adapter (HBA), and an example of network channel 582 includes an InfiniBand channel, a Fibre Channel, a Gigabit Ethernet channel, a proprietary channel architecture, or a combination thereof. In another embodiment, network interface 580 includes a wireless communication interface, and network channel 582 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 582 can be connected to an external network resource (not illustrated). The network resource can include another information handling system, a data storage system, another network, a grid management system, another suitable resource, or a combination thereof.

BMC 590 is connected to multiple elements of information handling system 500 via one or more management interface 592 to provide out-of-band monitoring, maintenance, and control of the elements of the information handling system. As such, BMC 590 represents a processing device different from processor 502 and processor 504, which provides various management functions for information handling system 500. For example, BMC 590 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 590 can vary considerably based on the type of information handling system. BMC 590 can operate in accordance with an Intelligent Platform Management Interface (IPMI). Examples of BMC 590 include an Integrated Dell R Remote Access Controller (iDRAC).

Management interface 592 represents one or more out-of-band communication interfaces between BMC 590 and the elements of information handling system 500, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 500, that is apart from the execution of code by processors 502 and 504 and procedures that are implemented on the information handling system in response to the executed code.

BMC 590 operates to monitor and maintain system firmware, such as code stored in BIOS/EFI module 542, option ROMs for graphics adapter 530, disk controller 550, add-on resource 574, network interface 580, or other elements of information handling system 500, as needed or desired. In particular, BMC 590 includes a network interface 594 that can be connected to a remote management system to receive firmware updates, as needed or desired. Here, BMC 590 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 590 utilizes various protocols and APIs to direct and control the processes for monitoring and maintaining the system firmware. An example of a protocol or API for monitoring and maintaining the system firmware includes a graphical user interface (GUI) associated with BMC 590, an interface defined by the Distributed Management Taskforce (DMTF) (such as a Web Services Management (WSMan) interface, a Management Component Transport Protocol (MCTP) or, a RedfishR interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 590 is included on a main circuit board (such as a baseboard, a motherboard, or any combination thereof) of information handling system 500 or is integrated onto another element of the information handling system such as chipset 510, or another suitable element, as needed or desired. As such, BMC 590 can be part of an integrated circuit or a chipset within information handling system 500. An example of BMC 590 includes an iDRAC or the like. BMC 590 may operate on a separate power plane from other resources in information handling system 500. Thus BMC 590 can communicate with the management system via network interface 594 while the resources of information handling system 500 are powered off. Here, information can be sent from the management system to BMC 490 and the information can be stored in a RAM or NV-RAM associated with the BMC. Information stored in the RAM may be lost after power-down of the power plane for BMC 590, while information stored in the NV-RAM may be saved through a power-down/power-up cycle of the power plane for the BMC.

Information handling system 500 can include additional components and additional busses, not shown for clarity. For example, information handling system 500 can include multiple processor cores, audio devices, and the like. While a particular arrangement of bus technologies and interconnections is illustrated for the purpose of example, one of skill will appreciate that the techniques disclosed herein are applicable to other system architectures. Information handling system 500 can include multiple central processing units (CPUs) and redundant bus controllers. One or more components can be integrated together. Information handling system 500 can include additional buses and bus protocols, for example, I2C and the like. Additional components of information handling system 500 can include one or more storage devices that can store machine-executable code, one or more communications ports for communicating with external devices, and various input and output (I/O) devices, such as a keyboard, a mouse, and a video display.

For purpose of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 500 can include processing resources for executing machine-executable code, such as processor 502, a programmable logic array (PLA), an embedded device such as a System-on-a-Chip (SoC), or other control logic hardware. Information handling system 500 can also include one or more computer-readable media for storing machine-executable code, such as software or data.

Those of ordinary skill in the art will appreciate that the configuration, hardware, and/or software components of management system 200 depicted in FIG. 2 may vary. For example, the illustrative components within management system 200 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Although FIG. 3 and FIG. 4 show example blocks of method 300 and method 400 in some implementation, method 300 and method 400 may include additional blocks, fewer blocks, different blocks, or differently arranged blocks than those depicted in FIG. 3 and FIG. 4. Those skilled in the art will understand that the principles presented herein may be implemented in any suitably arranged processing system. Additionally, or alternatively, two or more of the blocks of method 300 and/or method 400 may be performed in parallel. For example, block 435 and block 440 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The term "user" in this context should be understood to encompass, by way of example and without limitation, a user device, a person utilizing or otherwise associated with the device, or a combination of both. An operation described herein as being performed by a user may therefore be performed by a user device, or by a combination of both the person and the device.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. An information handling system, comprising:
   a processor; and
   a memory storing instructions which, when executed by the processor causes the processor to:
   receive a data object that includes a binary large object and a metadata file, wherein the binary large object includes a set of program instructions wherein the metadata file includes a current basic input/output system (BIOS) administrator password;
   verify authenticity of the data object; and
   when the verification of the authenticity of the data object is successful, then processing the data object that includes invoking a plugin based on the set of program instructions in the binary large object, wherein the set of program instructions is executable by at least the processor, and wherein the plugin invokes the processor to execute the set of program instructions with the current BIOS administrator password as an argument.

2. The information handling system of claim 1, wherein the binary large object includes a command that instructs an update manager to perform a software update.

3. The information handling system of claim 1, further comprising subsequent to executing the set of program instructions, receiving status code.

4. The information handling system of claim 1, wherein a remote management system manages an entitlement for the information handling system.

5. The information handling system of claim 4, wherein the entitlement is a secure key.

6. A method comprising:
   receiving a data object that includes a binary large object and a metadata file, wherein the binary large object includes a set of program instructions wherein the metadata file includes a current basic input/output system (BIOS) administrator password;
   verifying authenticity of the data object; and
   when the verifying the authenticity of the data object is successful, then processing the data object that includes invoking a plugin based on the set of program instructions in the binary large object, wherein the set of program instructions is executable by at least a processing device, and wherein the plugin invokes the processing device to execute the set of program instructions with the current BIOS administrator password as an argument.

7. The method of claim 6, wherein the binary large object includes a command that instructs an update manager to perform a software update.

8. The method of claim 6, further comprising subsequent to executing the set of program instructions, receiving status code from the processing device.

9. The method of claim 6, further comprising subsequent to executing the set of program instructions, rotating the current BIOS administrator password to a new BIOS administrator password on reboot.

10. The method of claim 6, wherein the data object includes a command to perform a BIOS update.

11. The method of claim 6, wherein the data object includes a BIOS configuration change with the current BIOS administrator password as the argument.

12. The method of claim 6, wherein the data object is created via an application programming interface request from a cloud service associated with a managed resource.

13. The method of claim 12, wherein the application programming interface request includes the binary large object as a payload.

14. A non-transitory computer-readable medium to store instructions that are executable to perform operations comprising:
   receiving a data object that includes a binary large object and a metadata file, wherein the binary large object includes a set of program instructions wherein the metadata file includes a current basic input/output system (BIOS) administrator password;
   verifying authenticity of the data object; and
   when the verifying the authenticity of the data object is successful, then processing the data object that includes invoking a plugin based on the set of program instructions in the binary large object, wherein the set of program instructions is executable by at least a processing device, and wherein the plugin invokes the processing device to execute the set of program instructions with the current BIOS administrator password as an argument.

15. The non-transitory computer-readable medium of claim 14, wherein the binary large object includes a command that instructs an update manager to perform a software update.

16. The non-transitory computer-readable medium of claim 14, the operations further comprising subsequent to executing the set of program instructions, receiving status code from the processing device.

17. The non-transitory computer-readable medium of claim 14, the operations further comprising subsequent to executing the set of program instructions, rotating the current BIOS administrator password to a new BIOS administrator password on reboot.

18. The non-transitory computer-readable medium of claim 14, wherein the data object includes a command to perform a BIOS update.

19. The non-transitory computer-readable medium of claim 14, wherein the data object includes a BIOS configuration change with the current BIOS administrator password as the argument.

20. The non-transitory computer-readable medium of claim 14, wherein the data object is created via an application programming interface request from a cloud service associated with a managed resource.

* * * * *